(12) United States Patent
Brint

(10) Patent No.: US 6,698,132 B1
(45) Date of Patent: Mar. 2, 2004

(54) BIRD DECOY AND METHOD

(76) Inventor: George W. Brint, 3760 Forest Hill Rd., Bolivar, TN (US) 38008

(*) Notice: Subject to any disclaimer, the term of this patent is extended or adjusted under 35 U.S.C. 154(b) by 0 days.

(21) Appl. No.: 10/314,479

(22) Filed: Dec. 9, 2002

(51) Int. Cl.$^7$ ............................................. A01M 31/06
(52) U.S. Cl. ................................................ 43/2; 43/3
(58) Field of Search ........................... 43/2, 3; 446/325, 446/351, 396, 486, 35; 40/417

(56) References Cited

U.S. PATENT DOCUMENTS

| | | | |
|---|---|---|---|
| 74,458 A | 2/1868 | Wales ................................ 43/3 |
| 278,461 A | 5/1883 | Screven ............................ 43/2 |
| 740,293 A | 9/1903 | Loeble ............................. 43/3 |
| 942,103 A | 12/1909 | Rigney ............................ 43/2 |
| 1,083,882 A | 1/1914 | Hindmarsh ...................... 43/3 |
| 1,224,044 A | 4/1917 | Thurman ...................... 40/417 |
| 1,746,640 A | 2/1930 | Emoff ............................. 43/3 |
| 1,831,286 A | 11/1931 | Chelini ............................ 43/3 |
| 2,028,849 A | 1/1936 | Shay ................................ 43/3 |
| 2,174,211 A | 9/1939 | Hutaff, Jr. ....................... 43/3 |
| 2,480,390 A | 8/1949 | Thompson ....................... 43/3 |
| 2,545,801 A | 3/1951 | Watson ........................ 40/417 |
| 2,638,705 A | * | 5/1953 | Petrasy ........................ 40/417 |
| 2,663,108 A | * | 12/1953 | Dixon et al. .................... 43/3 |

(List continued on next page.)

FOREIGN PATENT DOCUMENTS

| EP | 1279333 B1 | * | 1/2003 | |
| FR | 848634 B1 | * | 11/1939 | ....................... 43/3 |

(List continued on next page.)

OTHER PUBLICATIONS

"Flying Dove" packaging for a flying mechanical bird.
Cabelas Catalog p. 261 "Motion Rabbit" ad.

*Primary Examiner*—Darren W. Ark
(74) *Attorney, Agent, or Firm*—John M. Harrison

(57) ABSTRACT

A bird decoy for attracting predators, which decoy may be supported on a rod, a rod/spring combination or suspended from a limb or pole, with wings that selectively fold and flap up and down in life-like, actual and simulated flying, landing and take-off movements, the decoy simulating foraging, predator or waterfowl birds. In a first preferred embodiment the decoy is supported on the upper end of a spring which is secured to the upper end of an elongated support rod, the lower end of which support rod is typically inserted in the ground or in the bottom of a water body. The spring facilitates life-like simulated flying movements of the decoy to attract predators for photography, observation or hunting purposes. Alternatively, the decoy can be mounted directly on the stake itself, without using the spring. In a second embodiment, the decoy is constructed in the size and shape of a foraging, predator or waterfowl bird and is suspended from a limb or pole, for flying in a circle to attract the predators. In a third embodiment the decoy is configured to simulate one of the above bird groups and is operated with one wing folded and the other flapping to simulate injury or distress.

A method for attracting predators using a bird decoy which simulates a dove, quail, crow, hawk, duck, goose or the like and includes the steps of mounting the decoy on a rod or stake or on a spring attached to a rod or stake and causing the wings to flap, or suspending the decoy from a limb or pole and causing the decoy to flap its wings and fly in a circle, or folding one wing of the decoy, while allowing the other wing to flap.

8 Claims, 3 Drawing Sheets

U.S. PATENT DOCUMENTS

| | | | | |
|---|---|---|---|---|
| 2,704,908 A | * | 3/1955 | Lamkin | 40/417 |
| 2,729,022 A | * | 1/1956 | Polk | 40/417 |
| 2,747,316 A | * | 5/1956 | Benedetto | 43/3 |
| 2,849,823 A | * | 9/1958 | Miller | 43/3 |
| 2,953,869 A | * | 9/1960 | Collischan | 43/2 |
| 3,290,817 A | * | 12/1966 | Kravath | 446/227 |
| 3,435,550 A | * | 4/1969 | Carlson | 43/3 |
| 3,736,688 A | * | 6/1973 | Caccamo | 43/3 |
| 3,869,823 A | * | 3/1975 | Powers et al. | 43/3 |
| 4,228,977 A | * | 10/1980 | Tanaka | 43/2 |
| 4,432,158 A | * | 2/1984 | Nicholas | 446/325 |
| 4,896,448 A | * | 1/1990 | Jackson | 43/3 |
| 4,901,458 A | * | 2/1990 | Belokin et al. | 40/417 |
| 4,949,486 A | * | 8/1990 | Belokin et al. | 40/417 |
| 4,965,953 A | | 10/1990 | McKinney | 43/2 |
| 5,003,722 A | * | 4/1991 | Berkley et al. | 43/3 |
| 5,515,637 A | | 5/1996 | Johnson | 43/2 |
| 6,021,594 A | | 2/2000 | Krueger | 43/2 |
| 6,070,356 A | | 6/2000 | Brint et al. | 43/2 |
| 6,092,322 A | | 7/2000 | Samaras | 43/2 |
| 6,129,606 A | | 10/2000 | Yuen | 446/325 |
| 6,212,816 B1 | | 4/2001 | Babbitt et al. | 43/3 |
| 6,216,382 B1 | | 4/2001 | Lindaman | 43/2 |
| 6,266,912 B1 | | 7/2001 | Jirele | 43/2 |
| 6,293,042 B1 | * | 9/2001 | Arvanitis, Jr. et al. | 43/3 |
| 6,360,474 B1 | * | 3/2002 | Wurlitzer | 43/3 |
| 6,374,529 B1 | | 4/2002 | Petroski et al. | 43/3 |
| 6,385,895 B1 | | 5/2002 | Scaries | 43/2 |
| 6,430,863 B1 | * | 8/2002 | Krag | 43/3 |
| 6,449,894 B1 | * | 9/2002 | Price et al. | 43/3 |
| 6,493,980 B1 | * | 12/2002 | Richardson et al. | 43/3 |
| 6,572,428 B1 | * | 6/2003 | Weiser et al. | 446/35 |
| 6,574,902 B1 | * | 6/2003 | Conger | 43/2 |
| 6,574,904 B1 | * | 6/2003 | Fencel et al. | 43/3 |
| 2002/0162268 A1 | * | 11/2002 | Futcher | 43/3 |

FOREIGN PATENT DOCUMENTS

| | | | | |
|---|---|---|---|---|
| FR | 2646588 B1 | * | 11/1990 | |
| GB | 389522 B1 | | 3/1933 | 43/2 |
| GB | 406386 B1 | * | 3/1934 | 43/2 |
| GB | 611844 B1 | * | 11/1948 | 43/2 |
| GB | 966386 B1 | * | 8/1964 | 43/2 |
| GB | 2067064 B1 | * | 7/1981 | |
| GB | 2124464 B1 | * | 2/1984 | |
| GB | 2189124 B1 | * | 10/1987 | |
| GB | 2230171 B1 | * | 10/1990 | |
| IT | 262806 B1 | * | 2/1929 | 43/2 |
| IT | 471206 B1 | * | 5/1952 | 43/2 |
| IT | 624517 B1 | * | 9/1961 | 43/2 |
| SE | 129808 B1 | * | 10/1950 | 43/2 |

* cited by examiner

BIRD DECOY AND METHOD

BACKGROUND OF THE INVENTION

Field of the Invention

This invention relates to decoys for use by hunters and photographers and more particularly, to a method of attracting predators such as coyotes, bobcats, foxes, wolves, bear and the like, using a lightweight bird decoy that simulates a migratory, forager, predator or waterfowl bird having a decoy body which is typically supported on a rod or stake or on a spring attached to the rod or stake or suspended, typically by monofilament fishing line, from a limb or pole, to impart life-like movements to the decoy when the wings flap in an up and down motion. In a first preferred embodiment the decoy is configured in the shape of a dove, quail, crow, hawk, duck, goose or the like and is supported on the upper end of a typically tapered spring which is provided on the upper end of an elongated support rod or stake, the lower end of which support rod is typically inserted in the ground or in the bottom of a water body. The tapered spring facilitates life-like simulated flying, take-off, landing and foraging movements of the decoy, imparted by the flapping wing or wings, to attract predators or other wild animals for photography, observation or hunting purposes. In a second embodiment, a flying bird decoy is suspended from a limb or pole by means of nearly invisible monofilament line to facilitate a life-like circular flying motion of the decoy. A simulated injury, panic or distress is imparted to the decoy in a third embodiment of the invention by mounting the decoy on the rod or spring as described above, folding one wing and operating the decoy to cause flapping of the extended wing and erratic, typically circular movement of the decoy.

BRIEF DESCRIPTION OF THE DRAWINGS

The invention will be better understood by reference to the accompanying drawings, wherein.

DESCRIPTION OF THE PREFERRED EMBODIMENTS

Figure 1:
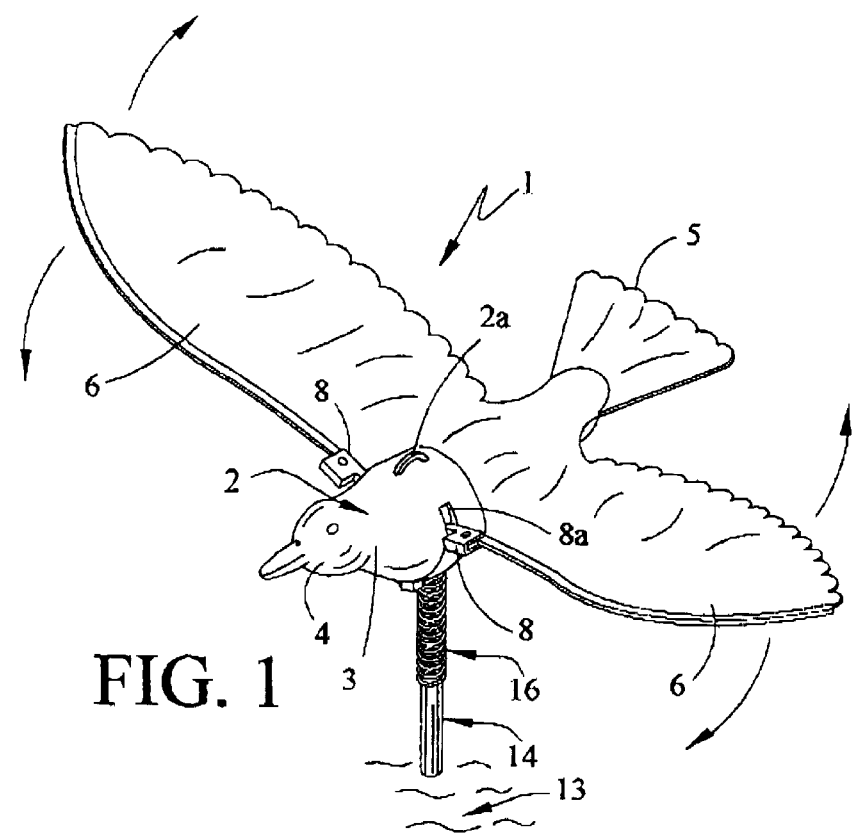
FIG. 1 is a perspective view of a preferred bird decoy embodiment of this invention, with the decoy mounted on a spring fixed to a rod or stake inserted in the ground.
Figure 2:
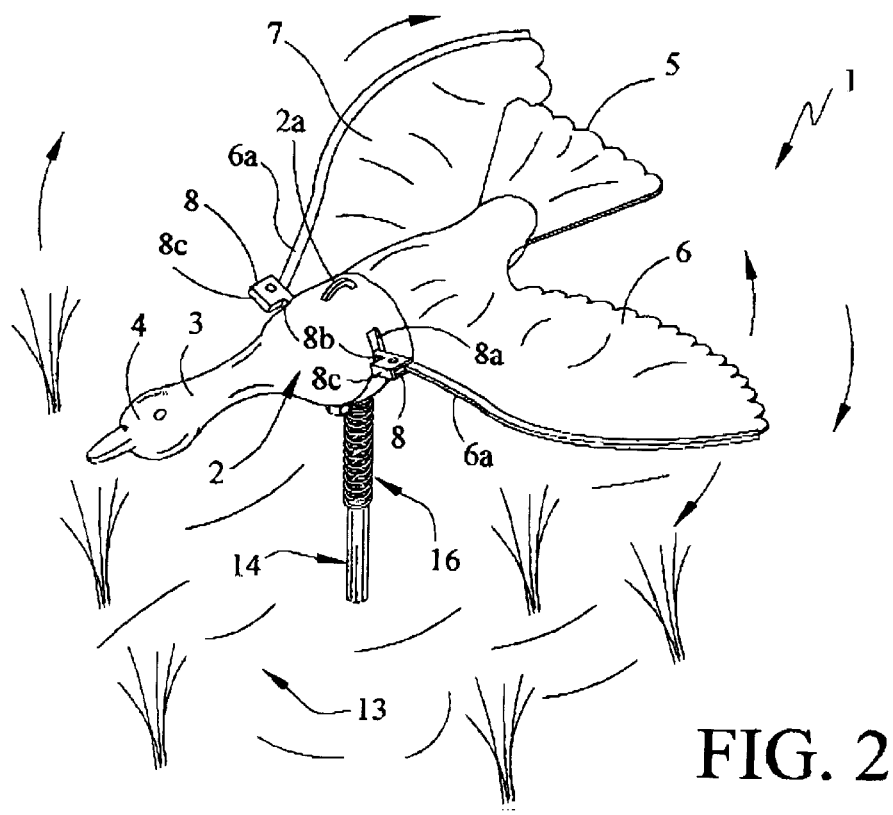
FIG. 2 is a perspective view of the bird decoy and the tapered spring and support rod elements of the bird decoy illustrated in FIG. 1, with one wing of the decoy extended and the other wing folded in a distressed configuration.
Figure 3:
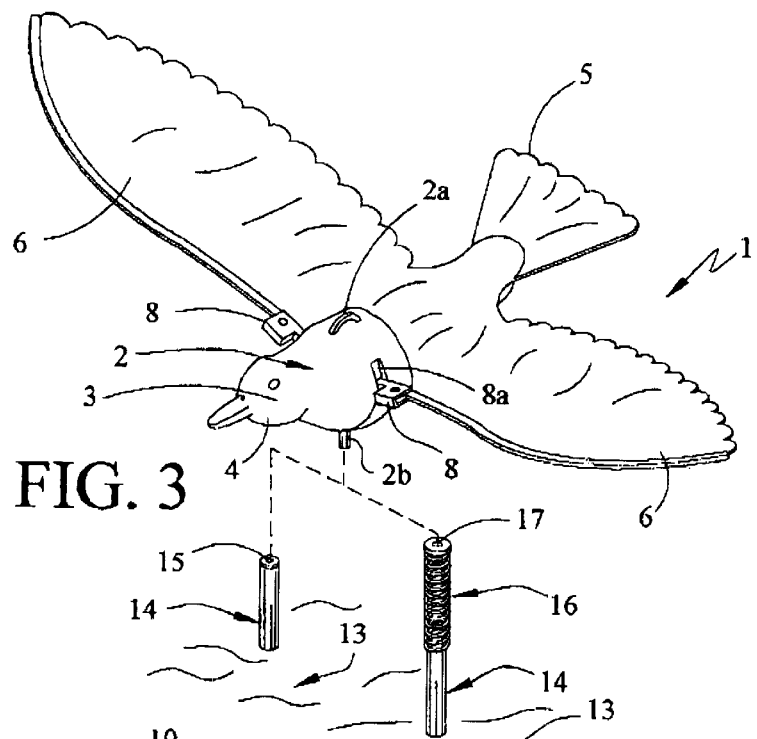
FIG. 3 is an exploded, perspective view of the bird decoy, tapered spring and support rod elements of the bird decoy, illustrating alternative decoy mounting techniques.

Referring initially to FIGS. 1 and 3 of the drawings a bird decoy is generally illustrated by reference numeral 1 and includes a decoy body 2, which may be typically shaped and colored to simulate a migratory and/or foraging bird such as a dove, quail, crow or a predator, which includes owls and hawks, and/or a waterfowl, such as a duck or goose, in non-exclusive particular. A neck 3 extends from the decoy body 2 and is terminated by a head 4, shaped to resemble one of the above, as desired. Simulated tail feathers 5 also project from the opposite end of the decoy body 2 from the head 4 and the extended wings 6 are typically attached to the decoy body 2 by means of wing pins 8 in a retractable manner, such that the wings 6 can be extended in simulated flying configuration and are designed to flap up and down as indicated by the arrow, responsive to the operation of a small, battery-powered motor (not illustrated), located inside the decoy body 2 and geared to the wing pins 8. The wing pins 8 are guided in their movement along the decoy body 2 by openings 8a located in the sides of the decoy body 2. The wing pins 8 have inner portions 8b which partially extend into the openings 8a. The wing pins 8 also have outer portions 8c with slots which receive forward portions 6a of the wings therein so that the wings may be caused to flap by the motor. In order to fold the wings the forward portion 6a of each wing is retracted from the slot in each outer portion 8c and turned such that the forward portion is out of the slot and placed in generally non-parallel relation behind the rear portion of the wing pin 8 (see FIG. 2). The bird decoy 1 may be of the flying design, as hereinafter described, or it may be designed such that one or more of the wings 6 flap up and down in a simulated flying action. A body hook 2a is provided on the top side of the decoy body 2 for purposes which will be hereinafter further described. Furthermore, a body pin 2b, more particularly illustrated in FIG. 3 of the drawings, is typically fixed to the underside of the decoy body 2 and is typically provided with threads for threadable insertion in the spring receptacle 17 of a spring 16, or in the end of the spring 16, typically mounted on a support stake or rod 14 in any suitable fashion, to support the bird decoy 1 at a selected distance above the ground, as indicated. Alternatively, as further illustrated in FIG. 3, the support rod 14 can be provided with a rod hole or receptacle 15 for receiving the threaded body pin 2b and attaching the flying bird decoy 1 directly to the support rod 14 for the same purpose. Accordingly, flapping of the wings 6 simulates a take-off or landing sequence of the bird decoy 1 as it is fixed or rotatably attached to the spring 16 or directly to the support rod 14. Furthermore, the support rod 14 can be of any desired length and shape that facilitates insertion in the ground 13, as indicated. Alternatively, any other desired fixed or rotatable connection between the decoy body 2 and the spring 16 or the support rod 14 can be used, according to the knowledge of those skilled in the art. Moreover, the spring 16 can be tapered from a large diameter at the bottom for fitting over the support rod 14 in a friction-fit, to a smaller diameter at the top for receiving the body pin 2b, either in a fixed or rotatable connection.

Figure 4:
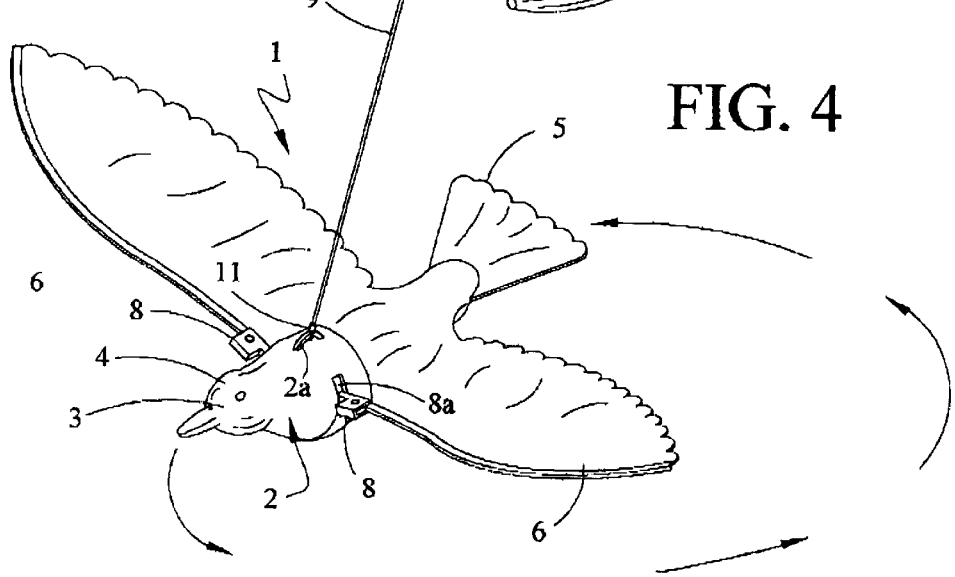
FIG. 4 is a perspective view of a typical forager or predator flying bird decoy embodiment, with the decoy circular flying movement illustrated as the decoy is supported by a line or string from a tree limb.

Referring now to FIG. 4 of the drawings a flying embodiment of the bird decoy 1 can be suspended at a knot 11 on the body hook 2a, from a limb 12 at a loop 10, using a suspension line 9 which is typically clear monofilament fishing line of small diameter, to reduce visibility to a predator. Accordingly, the bird decoy 1 is designed to fly in a circle at a selected height above the ground about the suspension line 9 tether, as indicated by the arrows, as the extended wings 6 flap up and down, to simulate a dove, quail, crow, hawk, owl, duck or goose, in non-exclusive particular, as the case may require and attract predators.

Referring to FIG. 2 of the drawings one of the extended wings 6 of the bird decoy 1 is retracted on the corresponding wing pin 8 to define a folded wing 7, in order to simulate a distressed or wounded bird. This simulation is enhanced by the up and down flapping movement of the extended wing 6 and the vibration of the folded wing 7, which erratic flapping and vibration motion is accentuated by the spring 16, mounted on the support rod 14. Alternatively, under circumstances where the erratic action of the bird decoy 1 is to be attenuated, the decoy body 2 can be mounted directly on the support rod 14, as illustrated in FIG. 3, and as described above. Accordingly, the bird decoy 1 illustrated in FIG. 2 can be designed to simulate the distressed movements of an injured dove, quail, crow, hawk, owl, duck, goose or the like, to attract a predator of choice, as the bird decoy 1 moves erratically, typically in a circle, pivoting on the spring 16 or the support rod 14, as illustrated by the arrows in FIG. 2.

Figure 5:
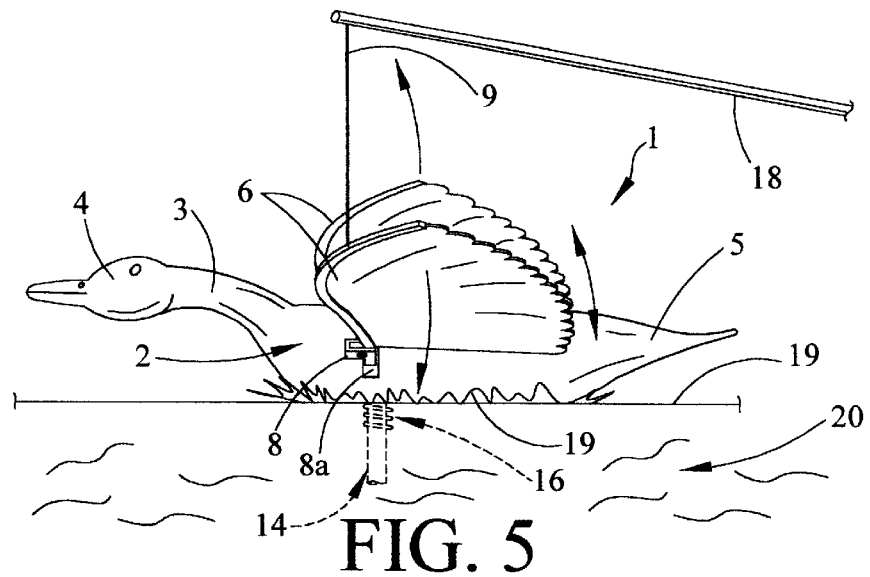
FIG. 5 is a side view of a waterfowl decoy embodiment, with the simulated decoy flying movement shown in a low, typically landing or take-off position on a water body.
Figure 6:
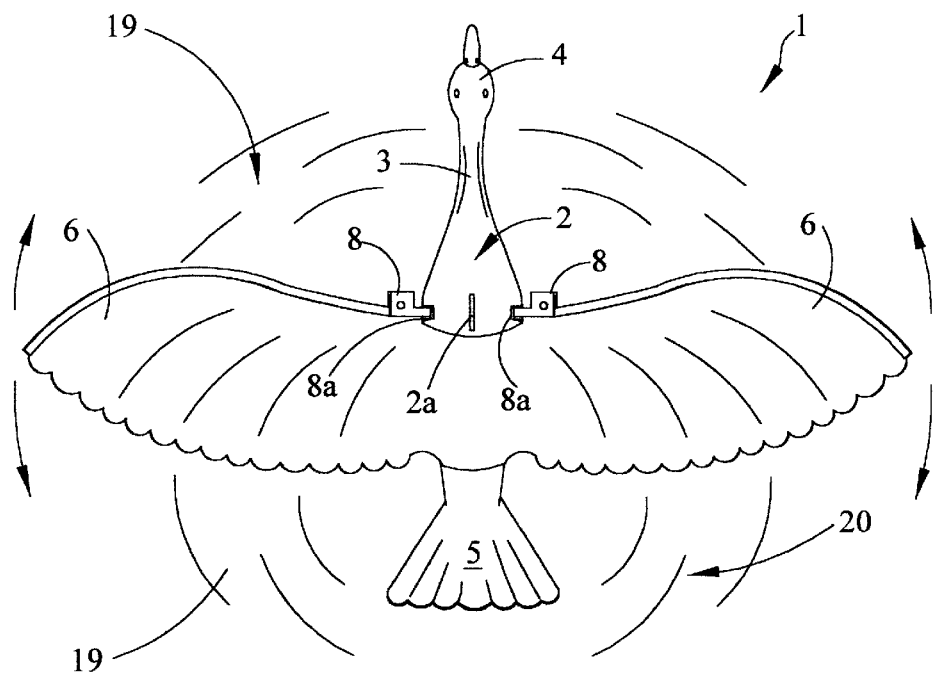
FIG. 6 is a top view of the waterfowl decoy illustrated in FIG. 5, more particularly illustrating a typical circular movement of the decoy responsive to flapping of the decoy wings.

Referring now to FIGS. 5 and 6 of the drawings in another preferred embodiment of the invention the bird decoy 1 is designed to simulate a waterfowl such as a duck or goose and may be suspended at or near the waterline 19 of a water body 20, by means of a support 18 such as a pole, rod or the like, extending from a point of anchor on the bank or from a stump, limb, tree or other fixed object (not illustrated), using a suspension line 9 which is typically characterized as clear monofilament fishing line of small diameter to facilitate reduced visibility to a predator. As in the case of the flying bird decoy 1 illustrated in FIG. 4, one end of the suspension line 9 is tied to the support 18 while the opposite end is typically affixed to the body hook 2a of the decoy body 2, such that the bird decoy 1 can be positioned at or near the waterline 19, as illustrated, with the extended wings 6 moving up and down as indicated by the arrow, to stir the water body 20 at the water line 19 and typically cause the duck or goose simulation to slowly move in a circle as indicated by the arrows in FIG. 6 and attract the attention of a predator. Alternatively, one of the wings 6 can be retracted on the corresponding wing pin 8 to define a folded wing 7 and further enhance the vibration and erratic movement of the decoy 1 at or near the water line 19, for simulating a duck or goose in distress, with a broken or wounded wing. Further in the alternative, a rod or stake 14 (illustrated in phantom in FIG. 5), with or without a spring 16 can be extended into the water bottom of the water body 20 and used to support the bird decoy 1 at or near the waterline 19, instead of the support 18, as illustrated in phantom in FIG. 5 and also in FIGS. 2 and 3 of the drawings.

It will be appreciated by those skilled in the art that bird decoy 1 of this invention, in all of the embodiments illustrated in the drawings, is designed to facilitate up and down flapping of the extended wings 6 in a flying (FIG. 4), or simulated flying, take-off or landing configuration (FIGS. 1, 3, 5 and 6) and vibration and simulated injured movement of a folded wing 7 in distressed configuration (FIG. 2), to attract a predator such as coyote, bobcat, fox, wolf, bear or the like. It will be further appreciated that the bird decoy can be configured by injection-molding or other plastic shaping techniques, in appropriate colors ascending to the knowledge of those skilled in the art to simulate migratory and/or foraging birds such as dove, quail and crows; predator birds, including hawks and owls; and waterfowl, such as ducks and geese, in non-exclusive particular.

In use, the bird decoy 1 and support elements can be quickly and easily carried to the hunting site, where the bird decoy 1 is attached to the support rod 14 directly as illustrated in FIG. 3 or to a spring 16 secured to a support rod 14, as further illustrated in FIG. 3 for easy assembly in the field and a switch (not illustrated) then manipulated to energize a battery (not illustrated) inside the decoy body 2 and facilitate flapping of the extended wings 6 up and down. Alternatively, one wing 6 can be folded to facilitate vibration or alternative erratic, circular and simulated distressed movement of the bird decoy 1 in such a manner as to attract a predator of choice. Further in the alternative, a suspension line 9, typically characterized by a clear monofilament fishing line of small diameter to reduce visibility to the predator, can be used to tether a flying bird decoy 1 to a limb 12 (FIG. 4) or a pole or other support 18 (FIG. 5) and facilitate actual flying of the bird decoy 1 in a circle by flapping of the extended wings 6. Vibration and erratic movement of the decoy 1 in a simulated injured or damaged condition, either over land or over a water body 20 and in the latter case, typically at or near the waterline 19, can also be achieved as described above. Accordingly, it will be appreciated that the bird decoy 1 can be used in simulated distressed, take-off and landing, as well as actual flying conditions, as desired, by the user. Moreover, a single flying model or embodiment of the bird decoy 1 can be used in all of the embodiments described above, although the bird decoy 1 actually flies only when tethered and suspended from above, as heretofore described. While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A bird decoy for attracting predators comprising:
   a decoy body in the configuration of a bird selected from a group consisting of foraging birds, predator birds, and waterfowls;
   a pair of motor-driven flapping wings extending outwardly from the sides of the decoy body and being attached to the decoy body by a pair of wing pins, each wing pin having an inner portion which partially extends into an opening in one of the sides of the decoy body and an outer portion having a slot that receives a forward portion of one of the wings in a normal configuration, the flapping wings flapping upwardly and downwardly when actuated in the normal configuration, each of the wings capable of being folded into a folded configuration by retracting the forward portion of each wing from the respective slot such that the forward portion is out of the slot and placed in generally non-parallel relation behind a rear portion of the wing pin; and
   a support;
   wherein said decoy body is rotatably attached to and on top of the support, the decoy body also capable of continuously rotating on said support when one of said flapping wings being in the normal configuration flaps and the other of said flapping wings being in the folded configuration vibrates.

2. The bird decoy of claim 1, wherein said decoy body is in the configuration of a foraging bird comprising a dove, quail, turkey or crow.

3. The bird decoy of claim 1, wherein said decoy body is in the configuration of a predator bird comprising a hawk or owl.

4. The bird decoy of claim 1, wherein said decoy body is in the configuration of a waterfowl, comprising a duck or goose.

5. A method of attracting predators, comprising the steps of:

(a) providing a bird decoy for attracting predators comprising:
- a decoy body in the configuration of a bird selected from the group consisting of foraging birds, predator birds and waterfowl;
- a pair of motor-driven flapping wings extending outwardly from the sides of the decoy body and being attached to the body decoy by a pair of wing pins, each wing having an inner portion which partially extends into an opening in one of the sides of the decoy body and an outer portion having a slot that receives a forward portion of one of the wings in a normal configuration, the flapping wings flapping upwardly and downwardly when actuated in the normal configuration, each of the wings capable of being folded into a folded configuration by retracting the forward portion of each wing from the respective slot such that the forward portion is out of the slot and placed in generally non-parallel relation behind a rear portion of the wing pin;
- a support;
- wherein said decoy body is rotatably attached to and on top of the support, the decoy body also capable of continuously rotating on said support when one of said flapping wings being in the normal configuration flaps and the other of said flapping wings being in a folded configuration vibrates;

(b) folding the other of said flapping wings such that it is in the folded configuration; and (c) causing the one of said flapping wings to flap to thereby simulate a distressed motion in the decoy body.

6. The method according to claim 5 comprising the step of interposing a spring between the bird decoy body and the support to enhance the motion of the bird decoy body.

7. The method according to claim 5 comprising the step of extending the support into the ground to a selected depth for locating the bird decoy body a selected distance above the ground.

8. The method according to claim 7 comprising the step of interposing a spring between the bird decoy body and the support to enhance the motion of the bird decoy body.

\* \* \* \* \*